(12) United States Patent
Prodoehl et al.

(10) Patent No.: US 8,236,135 B2
(45) Date of Patent: Aug. 7, 2012

(54) MULTI-PLY TISSUE PRODUCTS

(75) Inventors: Michael Scott Prodoehl, West Chester, OH (US); LaTisha Evette Salaam, Cincinnati, OH (US); Joseph Jay Bullock, Mt. Healthy, OH (US); Diane R. Neilson, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 522 days.

(21) Appl. No.: 11/581,562

(22) Filed: Oct. 16, 2006

(65) Prior Publication Data

US 2008/0087395 A1    Apr. 17, 2008

(51) Int. Cl.
*D21H 27/30*    (2006.01)

(52) U.S. Cl. ..................... 162/125; 162/127

(58) Field of Classification Search .............. 162/109, 162/125, 127
See application file for complete search history.

(56) References Cited

U.S. PATENT DOCUMENTS

| | | |
|---|---|---|
| 2,826,551 A | 3/1958 | Geen |
| 3,953,638 A | 4/1976 | Kemp |
| 3,964,500 A | 6/1976 | Drakoff |
| 3,994,771 A | 11/1976 | Morgan et al. |
| 4,100,017 A | 7/1978 | Flautt |
| 4,300,981 A | 11/1981 | Carstens |
| 4,364,837 A | 12/1982 | Pader |
| 4,469,735 A | 9/1984 | Trokhan |
| 4,528,239 A | 7/1985 | Trokhan |
| 4,529,480 A | 7/1985 | Trokhan |
| 5,059,282 A | 10/1991 | Ampulski |
| 5,529,665 A | 6/1996 | Kaun |
| 5,552,020 A | 9/1996 | Smith et al. |
| 5,830,558 A | 11/1998 | Barnholtz |
| 5,906,711 A | 5/1999 | Barnholtz |
| 5,919,556 A | 7/1999 | Barnholtz |
| 6,162,237 A | 12/2000 | Chan |
| 6,162,327 A * | 12/2000 | Batra et al. ................. 162/109 |
| 6,270,875 B1 | 8/2001 | Nissing |
| 6,309,731 B1 | 10/2001 | Takeuchi et al. |
| 6,602,387 B1 | 8/2003 | Loughran et al. |
| 6,649,025 B2 | 11/2003 | Mills et al. |
| 6,723,203 B2 | 4/2004 | Roussel et al. |
| 6,827,819 B2 | 12/2004 | Dwiggins |
| 2004/0163781 A1* | 8/2004 | Hernandez-Munoa et al. 162/91 |
| 2005/0022955 A1 | 2/2005 | Ward |

FOREIGN PATENT DOCUMENTS

GB    849433    9/1960

OTHER PUBLICATIONS

McDonough et al., Factors Affecting the Outlook for Utilization of Hardwoods in Pulping and Papermaking, May 1985, IPC technical Paper Series, No. 154, whole document.*
*Silicon Compounds Register and Review*, Petrarch Systems, pp. 181-217 (1987).

* cited by examiner

*Primary Examiner* — Anthony Calandra
(74) *Attorney, Agent, or Firm* — Peter D. Meyer (57) ABSTRACT

A multi-ply paper product is disclosed. The multi-ply paper product is provided with a first play and a second ply. The first ply is a lotioned fibrous structure having a wet burst of less than about 100 grams. The second ply is a non-lotioned fibrous structure having a wet burst of greater than about 100 grams.

21 Claims, 2 Drawing Sheets

MULTI-PLY TISSUE PRODUCTS

FIELD OF THE INVENTION

The present invention relates to fiber structures and sanitary tissue product comprising such fibrous structures. More particularly, the present invention relates to multi-ply paper products where a first ply has a wet burst of less than about 100 grams and a second ply has a wet burst of greater than about 100 grams.

BACKGROUND OF THE INVENTION

Fibrous structures are known in the art. For example, facial tissues typically comprise one or more layers, or plies, of a fibrous structure having a relatively low basis weight. Several layers of these low basis weight plies are required in order to provide for a tissue having the physical characteristics required for the intended use. For example, a single ply, or layer, of a facial tissue may have relatively low wet burst strength, total dry tensile strength, and limited stretch capabilities. Thus, the formulators of such fibrous tissue products are required to use multiple layers in order to increase these physical properties to provide a product that has acceptable consumer acceptance.

However, combining several plies of a single tissue structure necessarily requires additional product, as well as processing time in order to provide for the desired substrate.

Accordingly, there is a long felt need to identify and develop fibrous structures that have the desired physical characteristics of a consumer acceptable facial tissue product, yet comprise as few layers as possible in order to minimize material and processing costs. Such a product should provide perceived consumer benefits normally associated with facial tissues, as well as provide an increased performance benefit with minimum waste and/or cost.

SUMMARY OF THE INVENTION

The present invention provides for a multi-ply paper product comprising a first ply and a second ply. The first ply comprises a lotioned fiber structure and has a wet burst of less than about 100 grams. The second ply comprises a non-lotioned fiber structure and has a wet burst of greater than about 100 grams.

The present invention also provides for a multi-ply paper product where the first ply comprises a fibrous structure having a softening additive disposed thereon and a wet burst of less than about 100 grams. The second ply comprises a fibrous structure having no softening additive disposed thereupon and a wet burst of greater than about 100 grams.

Another embodiment of the present invention provides for a multi-ply paper product where the first ply comprises a fibrous structure having a softening additive and a lotion disposed thereon. The first ply has a wet burst of less than about 100 grams. The second ply comprises a fibrous structure having no softening additive and no lotion disposed thereupon. The second ply has a wet burst of greater than about 100 grams.

DETAILED DESCRIPTION OF THE INVENTION

Definitions

"Basis weight", as used herein, is a weight-per-unit area of a sample reported in pounds per 3,000 ft$^2$ or g/m$^2$.

"Cross-machine direction" or "CD", as used herein, means the direction orthogonal to the machine direction and in the same plane of the fibrous structure and/or fibrous structure product comprising the fibrous structure.

"Densified", as used herein, means a portion of a fibrous structure product that exhibits a greater density than another portion of the fibrous structure product.

"Fiber", as used herein, means an elongate particulate having an apparent length greatly exceeding its apparent width (i.e., a length-to-diameter ratio of at least about 10). More specifically, as used herein, "fiber" refers to paper making fibers. The present invention contemplates the use of a variety of paper making fibers, such as, for example, natural fibers, synthetic fibers, any other suitable fibers, and combinations thereof. Paper making fibers useful in the present invention may include cellulosic fibers (commonly known as wood pulp fibers), applicable wood pulps (include chemical pulps, such as kraft sulfite and sulfate pulps), as well as mechanical pulps (i.e., ground wood, thermomechanical pulp, and/or chemically modified thermomechanical pulp). Chemical pulps, however, may be preferred since they can impart a superior tactile sense of softness to tissue sheets made therefrom. Pulps derived from both deciduous trees (also referred to as "hardwood") and coniferous trees (also referred to as "softwood") may be utilized. The hardwood and softwood fibers can be blended. Alternatively, the fibers can be deposited in layers to provide a stratified web. Such exemplary layering of hardwood and softwood fibers is disclosed in U.S. Pat. Nos. 4,300,981 and 3,994,771. Also applicable to the present invention are fibers derived from recycled paper which may contain any or all of the above categories, as well as other non-fibrous materials, such as fillers and adhesives used to facilitate the paper making process. In addition, fibers and/or filaments made from polymers, specifically hydroxyl polymers, may be utilized in the present invention. Non-limiting examples of suitable hydroxyl polymers may include, but not be limited to, polyvinyl alcohol, starch, starch derivatives, chitosan, chitosan derivatives, cellulose derivatives, gums, arabinans, galactans, and combinations thereof.

"Machine direction" or "MD", as used herein, means the direction parallel to the flow of the fibrous structure through the papermaking machine and/or product manufacturing equipment.

"Non-densified", as used herein, means a portion of a fibrous structure product that exhibits a lesser density than another portion of the fibrous structure product.

"Ply" or "plies", as used herein, means an individual fibrous structure optionally to be disposed in a substantially contiguous face-to-face relationship with other plies forming a multi-ply fibrous structure. It is also contemplated that a single fibrous structure can effectively form two plies or multiple plies; for example, by being folded upon itself.

"Sanitary tissue product", as used herein, means one or more fibrous structures, converted or not, that is useful as a wiping implement for post-urinary and post-bowel movement cleaning (bath tissue), for otorhinolaryngological discharges (facial tissue and/or disposable handkerchiefs), and multi-functional absorbent and cleaning uses (absorbent towels and/or wipes).

"Sheet caliper" or "caliper", as used herein, means the macroscopic thickness of a sample.

"Stretch", as used herein, is determined by measuring a fibrous structure's dry tensile strength in the MD and/or CD.

"User contacting surface", as used herein, means that portion of the fibrous structure and/or surface treating composition and/or lotion composition that is present directly and/or indirectly on the surface of the fibrous structure that is exposed to the external environment. In other words, it is the surface formed by the fibrous structure including any surface treating composition and/or lotion composition present directly and/or indirectly of the surface of the fibrous structure that can contact an opposing surface during use.

The user contacting surface may be present on the fibrous structure and/or sanitary tissue product for the use by the user and/or user contacting surface may be created/formed prior to and/or during the use of the fibrous structure and/or sanitary tissue product by the user. This may occur by the user applying pressure to the fibrous structure and/or sanitary tissue product as the user contact the user's skin with the fibrous structure and/or sanitary tissue product.

"Wet burst strength", as used herein, is a measure of the ability of a fibrous structure and/or a fibrous structure product incorporating a fibrous structure to absorb energy when wet and subjected to deformation normal to the plane of the fibrous structure and/or fibrous structure product.

All percentages and ratios are calculated by weight unless otherwise indicated. Furthermore, all percentages and ratios are calculated based on the total composition unless otherwise stated. Additionally, unless otherwise noted, all component or composition levels are in reference to the active level of that component or composition and are exclusive of impurities; for example, residual solvents or by-products which may be present in commercially available sources.

First Ply

Figure 1:
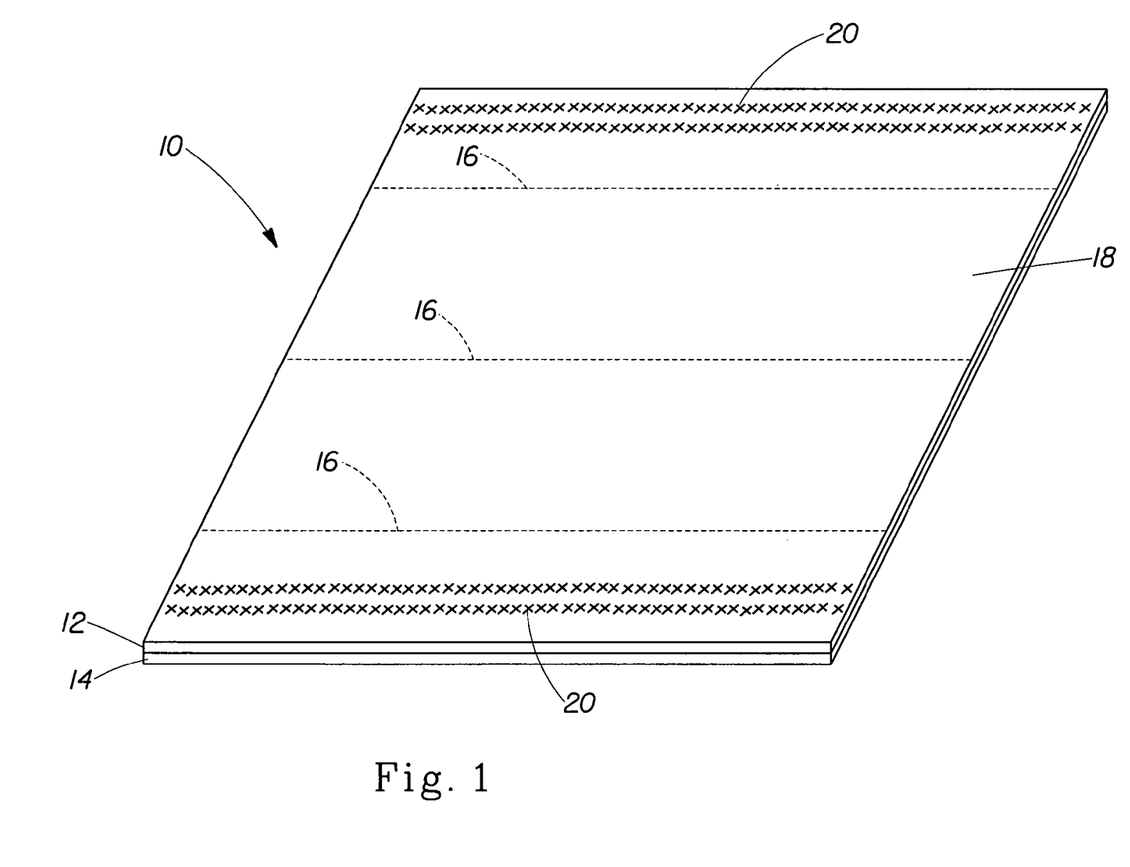
FIG. 1 is a perspective view of a multi-ply paper product according to the present invention; and, FIG. 2 is a plan view of the substrate of FIG. 1.
Figure 2:
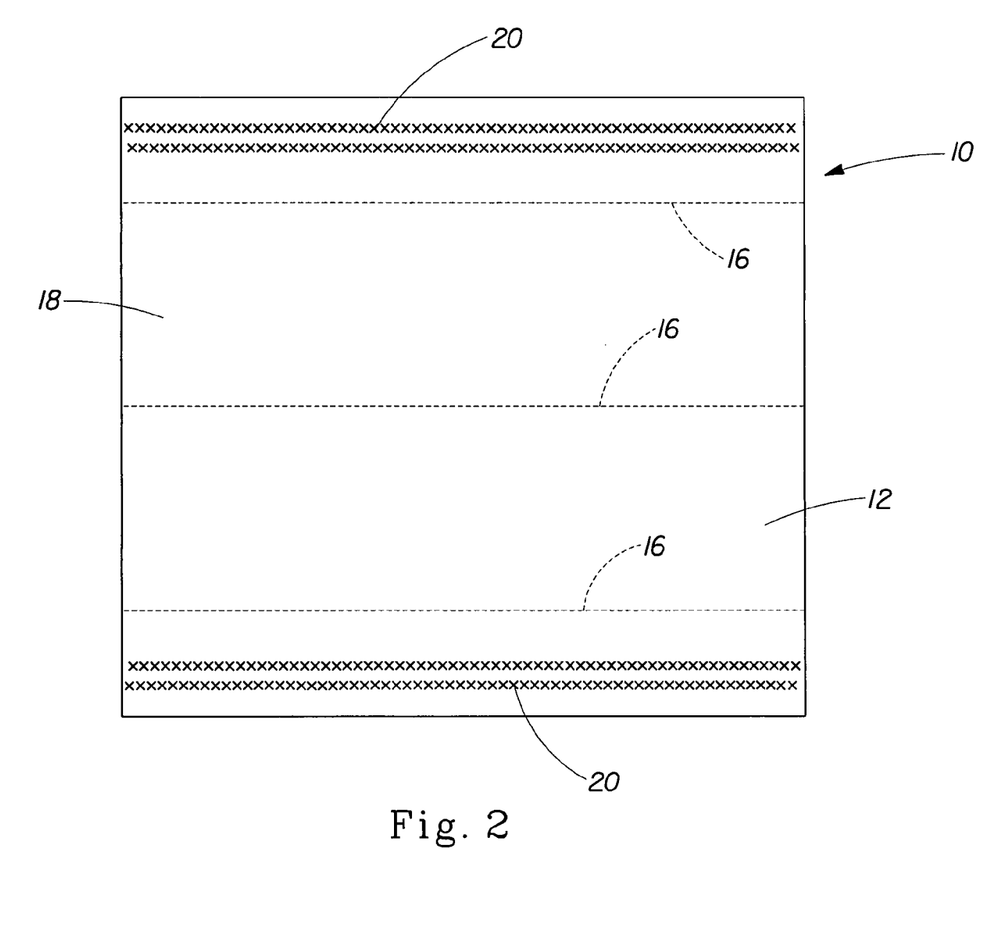

As shown in FIGS. 1 and 2, the multi-ply paper product 10 preferably comprises a first ply 12 having a surface 18 and a second ply 14. The first ply 12 of the multi-ply paper product 10 of the present invention preferably comprises a fibrous structure. The surface 18 preferably comprises a surface treating composition and/or a lotion composition. Any surface treating or lotion compositions may not be visibly discernible as a distinct layer on the surface of the fibrous structure.

The fibrous structure comprising first ply 12 may comprise a ply of fibrous structures selected from the group consisting of through-air dried fibrous structure plies, differential density fiber structure plies, wet-laid fibrous structure plies, air-laid fibrous structure plies, conventional fiber structure plies, and combinations thereof. Fibrous structures suitable for use for first ply 12 may comprise identical types of plies or mixtures of different types of plies. Additionally, the fibrous structure comprising first ply 12 may be foreshortened by creping and/or by wet micro contraction and/or by rush transferring. However, as would be known to one of skill in the art, the fibrous structure comprising first ply 12 may not be foreshortened.

Any compositions present on the surface 18 of first ply 12 may be present on the surface 18 of the first ply 12 in the form of a pattern such that they cover less than the entire surface area of the surface 18 of the first ply 12. Alternatively, any compositions present on the surface 18 of the first ply 12 may cover the entire, or substantially the entire, surface 18.

The surface treating composition and/or lotion composition may be applied to the surface 18 of first ply 12 by any suitable means known in the art. This would include any contact or contact-free application suitable for applying the surface treating composition and/or lotion, such as spraying, dipping, padding, printing, slot extruding, in rows or patterns, rotogravure printing, flexographic printing, off-set printing, screen printing, mask or stencil application processes, and combinations thereof. Such surface treating compositions and/or lotions can be applied to the fibrous structure comprising first ply 12 before, concurrently, or after the lotion composition application to the fibrous structure comprising first ply 12.

By way of example, a surface treating composition and/or lotion composition may be applied to the surface of first ply 12 during the fibrous structure making process, such as before and/or after drying the fibrous structure. Alternatively, the surface treating composition and/or lotion composition may be applied to the surface of first ply 12 during a converting process.

Surface Treating Composition

A surface treating composition, for purposes of the present invention, is a composition that improves the tactile sensation of a surface of a fibrous structure perceived by a user whom holds a fibrous structure and/or sanitary tissue product comprising the fibrous structure and rubs it across the user's skin. Such tactile perceivable softness can be characterized by, but is not limited to, friction, flexibility, and smoothness, as well as subjective descriptors, such as a feeling like lubricious, velvet, silk or flannel. The surface treating composition may or may not be transferable. Typically, it is substantially non-transferable.

The surface treating composition may increase or decrease the surface friction of the surface of a fibrous structure, especially the user contacting surface of a fibrous structure. Typically, the surface treating composition will reduce the surface friction of the surface of a fibrous structure compared to a surface of a fibrous structure without such surface treating composition being applied thereto.

The surface treating composition may have a wettability tension less than or equal to the surface tension of a lotion composition applied to a surface of a fibrous structure treated with the surface treating composition so as to minimize the spreading of the lotion composition that comes into contact with the surface treating composition and/or to reduce and/or inhibit migration of the lotion composition into the fibrous structure.

The surface treating composition preferably comprises a surface treating agent. The surface treating composition during application to the fibrous structure may preferably comprise at least about 0.1%, more preferably at least 0.5%, even more preferably at least about 1%, even yet more preferably at least about 3%, even more preferably at least about 5% to preferably no more than about 90%, more preferably no more than about 80%, even more preferably no more than about 70%, even yet more preferably no more than about 50%, and most preferably no more than about 40% by weight of the surface treating agent. In one example, the surface treating composition comprises from about 5% to about 40% by weight of the surface treating agent.

The surface treating composition present on the first ply 12 comprising a fibrous structure of the present invention may comprise at least about 0.01% and/or at least about 0.05% and/or at least about 0.1% of total basis weight of the surface treating agent. In one example, the fibrous structure and/or sanitary tissue product may comprise from about 0.01% to about 20% and/or from about 0.05% to about 15% and/or from about 0.1% to about 10% and/or from about 0.01% to about 5% and/or from about 0.1% to about 2% of total basis weight of the surface treating composition.

Non-limiting examples of suitable surface treating agents can be selected from the group consisting of: polymers such as polyethylene and derivatives thereof, hydrocarbons, waxes, oils, silicones, organosilicones (oil compatible), quaternary ammonium compounds, fluorocarbons, substituted $C_{10}$-$C_{22}$ alkanes, substituted $C_{10}$-$C_{22}$ alkenes, in particular derivatives of fatty alcohols and fatty acids(such as fatty acid amides, fatty acid condensates and fatty alcohol condensates), polyols, derivatives of polyols (such as esters and ethers), sugar derivatives (such as ethers and esters), polyglycols (such as polyethyleneglycol) and mixtures thereof.

In one example, the surface treating composition of the present invention is a microemulsion and/or a macroemulsion of a surface treating agent (for example an aminofunctional polydimethylsiloxane, specifically an aminoethylaminopropyl polydimethylsiloxane) in water. In such an example, the concentration of the surface treating agent within the surface treating composition may be from about 3% to about 60% and/or from about 4% to about 50% and/or from about 5% to about 40%. A non-limiting example of an exemplary microemulsion is commercially available from Wacker Chemie (MR1003, MR103, MR102). A nonlimiting example of such a macroemulsion is commercially available from General Electric Silicones (CM849).

Non-limiting examples of suitable waxes may be selected from the group consisting of paraffins, polyethylene waxes, beeswax, and mixtures thereof. Non-limiting examples of suitable oils may be selected from the group consisting of mineral oils, silicone oils, silicone gels, petrolatums, and mixtures thereof. Non-limiting examples of suitable silicones may be selected from the group consisting of polydimethylsiloxanes, aminosilicones, cationic silicones, quaternary silicones, silicone betaines, and mixtures thereof. Non-limiting examples of suitable polysiloxanes and/or monomeric/oligomeric units may be selected from the compounds having monomeric siloxane units of the following structure:

wherein, $R^1$ and R2, for each independent siloxane monomeric unit can each independently be hydrogen or any alkyl, aryl, alkenyl, alkaryl, arakyl, cycloalkyl, halogenated hydrocarbon, or other radical. Any of such radical can be substituted or unsubstituted. $R^1$ and $R^2$ radicals of any particular monomeric unit may differ from the corresponding functionalities of the next adjoining monomeric unit. Additionally, the polysiloxane can be either a straight chain, a branched chain or have a cyclic structure. The radicals $R^1$ and $R^2$ can additionally independently be other silaceous functionalities such as, but not limited to siloxanes, polysiloxanes, silanes, and polysilanes. The radicals $R^1$ and $R^2$ may contain any of a variety of organic functionalities including, for example, alcohol, carboxylic acid, phenyl, and amine functionalities. The end groups can be reactive (alkoxy or hydroxyl) or non-reactive (trimethylsiloxy). The polymer can be branched or unbranched.

In one example, suitable polysiloxanes include straight chain organopolysiloxane materials of the following general formula:

wherein each $R^1$-$R^9$ radical can independently be any $C_1$-$C_{10}$ unsubstituted alkyl or aryl radical, and $R^{10}$ of any substituted $C_1$-$C_{10}$ alkyl or aryl radical. In one example, each $R^1$-$R^9$ radical is independently any $C_1$-$C_4$ unsubstituted alkyl group. Those skilled in the art will recognize that technically there is no difference whether, for example, $R^9$ or $R^{10}$ is the substituted radical. In another example, the mole ratio of b to (a+b) is between 0 and about 20% and/or between 0 and about 10% and/or between about 1% and about 5%.

A non-limiting example of a cationic silicone polymer that can be used as a surface treating agent comprises one or more polysiloxane units, preferably polydimethylsiloxane units of formula —{$(CH_3)_2SiO$}$_c$— having a degree of polymerization, c, of from about 1 to about 1000 and/or from about 20 to about 500 and/or from about 50 to about 300 and/or from about 100 to about 200, and organosilicone-free units comprising at least one diquaternary unit. In one example, the cationic silicone polymer has from about 0.05 to about 1.0 and/or from about 0.2 to about 0.95 and/or from about 0.5 to about 0.9 mole fraction of the organosilicone-free units selected from cationic divalent organic moieties. The cationic divalent organic moiety may be selected from N,N,N',N'-tetramethyl-1,6-hexanediammonium units.

The cationic silicone polymer may contain from about 0 to about 0.95 and/or from about 0.001 to about 0.5 and/or from about 0.05 to about 0.2 mole fraction of the total of organosilicone-free units, polyalkyleneoxide amines of the following formula:

wherein Y is a divalent organic group comprising a secondary or tertiary amine, such as a $C_1$ to $C_8$ alkylenamine residue; a is from 2 to 4, and b is from 0 to 100.

Such polyalkyleneoxide amine-containing units can be obtained by introducing in the silicone polymer structure, compounds such as those sold under the tradename Jeffamine® from Huntsman Corporation. A preferred Jeffamine is Jeffamine ED-2003.

The cationic silicone polymer may contain from about 0 and/or from about 0.001 to about 0.2 mole fraction, of the total of organosilicone-free units, of —$NR_3+$ wherein R is alkyl, hydroxyalkyl or phenyl. These units can be thought of as end-caps. The cationic silicone polymer generally contains anions, selected from inorganic and organic anions.

A non-limiting example of a cationic silicone polymer comprises one or more polysiloxane units and one or more quaternary nitrogen moieties, and includes polymers wherein the cationic silicone polymer has the formula:

wherein:
R$^1$ is independently selected from the group consisting of: C$_{1-22}$ alkyl, C$_{2-22}$ alkenyl, C$_{6-22}$ alkylaryl, aryl, cycloalkyl, and mixtures thereof;
R$^2$ is independently selected from the group consisting of: divalent organic moieties that may contain one or more oxygen atoms (such moieties preferably consist essentially of C and H or of C, H and O);
X is independently selected from the group consisting of ring-opened epoxides;
R$^3$ is independently selected from polyether groups having the formula:

wherein M$^1$ is a divalent hydrocarbon residue; M$^2$ is independently selected from the group consisting of H, C$_{1-22}$ alkyl, C$_{2-22}$ alkenyl, C$_{6-22}$ alkylaryl, aryl, cycloalkyl, C$_{1-22}$ hydroxyalkyl, polyalkyleneoxide, (poly)alkoxy alkyl, and mixtures thereof;
Z is independently selected from the group consisting of monovalent organic moieties comprising at least one quaternized nitrogen atom;
a is from 2 to 4; b is from 0 to 100; c is from 1 to 1000 and/or greater than 20 and/or greater than 50 and/or less than 500 and/or less than 300 and/or from 100 to 200;
d is from 0 to 100; n is the number of positive charges associated with the cationic silicone polymer, which is greater than or equal to 2; and A is a monovalent anion.

Another nonlimiting example of a cationic silicone polymer comprises one or more polysiloxane units and one or more quaternary nitrogen moieties, and includes polymers wherein the cationic silicone polymer has the formula:

wherein:
R$^1$ is independently selected from the group consisting of: C$_{1-22}$ alkyl, C$_{2-22}$ alkenyl, C$_{6-22}$ alkylaryl, aryl, cycloalkyl, and mixtures thereof;
R$^2$ is independently selected from the group consisting of: divalent organic moieties that may contain one or more oxygen atoms;
-X is independently selected from the group consisting of ring-opened epoxides;
-R$^3$ is independently selected from polyether groups having the formula:

wherein M$^1$ is a divalent hydrocarbon residue; M$^2$ is independently selected from the group consisting of H, C$_{1-22}$ alkyl, C$_{2-22}$ alkenyl, C$_{6-22}$ alkylaryl, aryl, cycloalkyl, C$_{1-22}$ hydroxyalkyl, polyalkyleneoxide, (poly)alkoxy alkyl, and mixtures thereof;
X is independently selected from the group consisting of ring-opened epoxides;
W is independently selected from the group consisting of divalent organic moieties comprising at least one quaternized nitrogen atom;
a is from 2 to 4; b is from 0 to 100; c is from 1 to 1000 and/or greater than 20 and/or greater than 50 and/or less than 500 and/or less than 300 and/or from 100 to 200; d is from 0 to 100; n is the number of positive charges associated with the cationic silicone polymer, which is greater than or equal to 1; and A is a monovalent anion, in other words, a suitable counterion.

References disclosing non-limiting examples of suitable polysiloxanes include U.S. Pat. Nos. 2,826,551, 3,964,500, 4,364,837, 5,059,282, 5,529,665, 5,552,020 and British Patent No. 849,433 and *Silicon Compounds Register and Review*, Petrarch Systems, pp. 181-217 (1987), which contains an extensive listing and description of polysiloxanes in general.

Viscosity of polysiloxanes useful for this invention may vary as widely as the viscosity of polysiloxanes in general vary, so long as the polysiloxane can be rendered into a form which can be applied to the fibrous structures herein. This includes, but is not limited to, viscosity as low as about 25 centistokes to about 20,000,000 centistokes or even higher.

Non-limiting examples of suitable quaternary ammonium compounds may be selected from compounds having the formula:

wherein:
m is 1 to 3; each R$^1$ is independently a C$_1$-C$_6$ alkyl group, hydroxyalkyl group, hydrocarbyl or substituted hydrocarbyl group, alkoxylated group, benzyl group, or mixtures thereof; each R$^2$ is independently a C$_{14}$-C$_{22}$ alkyl group, hydroxyalkyl group, hydrocarbyl or substituted hydrocarbyl group, alkoxylated group, benzyl group, or mixtures thereof; and X$^-$ is any quaternary ammonium-compatible anion.

In another example, the quaternary ammonium compounds may be mono or diester variations having the formula:

wherein:
Y is —O—(O)C—, or —C(O)—O—, or —NH—C(O)—, or —C(O)—NH—, m is 1 to 3; n is 0 to 4; each R$^1$ is independently a C$_1$-C$_6$ alkyl group, hydroxyalkyl group, hydrocarbyl or substituted hydrocarbyl group, alkoxylated group, benzyl group, or mixtures thereof, each R$^3$ is independently a C$_{13}$-C$_{21}$ alkyl group, hydroxyalkyl group, hydrocarbyl or substituted hydrocarbyl group, alkoxylated group, benzyl group, or mixtures thereof, and X$^-$ is any quaternary ammonium-compatible anion.

In another example, the quaternary ammonium compound may be an imidazolinium compound, such as an imidazolinium salt.

As mentioned above, X$^-$ can be any quaternary ammonium-compatible anion, for example, acetate, chloride, bromide, methyl sulfate, formate, sulfate, nitrate and the like can also be used in the present invention. In one example, X$^-$ is chloride or methyl sulfate.

The surface treating composition may comprise additional ingredients such as a vehicle as described herein below which may not be present on the first ply 12 and/or sanitary tissue product comprising such fibrous structure. In one example, the surface treating composition may comprise a surface treating agent and a vehicle such as water to facilitate the application of the surface treating agent onto the surface of the fibrous structure.

Non-limiting examples of quaternary ammonium compounds suitable for use in the present invention include the well-known dialkyldimethylammonium salts such as ditallowdimethylammonium chloride, ditallowdimethylammonium methylsulfate, di(hydrogenated tallow)dimethylammonium chloride. In one example, the surface treating composition comprises di(hydrogenated tallow)dimethylammonium chloride, commercially available from Witco Chemical Company Inc. of Dublin, Ohio as Vanisoft 137®.

Non-limiting examples of ester-functional quaternary ammonium compounds having the structures named above and suitable for use in the present invention include the well-known diester dialkyl dimethyl ammonium salts such as diester ditallow dimethyl ammonium chloride, monoester ditallow dimethyl ammronium chloride, diester ditallow dimethyl ammonium methyl sulfate, diester di(hydrogenated) tallow dimethyl ammonium methyl sulfate, diester di(hydrogenated)tallow dimethyl ammonium chloride, and mixtures thereof. In one example, the surface treating composition comprises diester ditallow dimethyl ammonium chloride and/or diester di(hydrogenated)tallow dimethyl ammonium chloride, both commercially available from Witco Chemical Company Inc. of Dublin, Ohio under the tradename "ADOGEN SDMC".

Lotion Composition

A lotion composition applied to first ply 12 may comprise oils and/or emollients and/or waxes and/or immobilizing agents. In one example, the lotion composition comprises from about 10% to about 90% and/or from about 30% to about 90% and/or from about 40% to about 90% and/or from about 40% to about 85% of an oil and/or emollient. In another example, the lotion composition comprises from about 10% to about 50% and/or from about 15% to about 45% and/or from about 20% to about 40% of an immobilizing agent. In another example, the lotion composition comprises from about 0% to about 60% and/or from about 5% to about 50% and/or from about 5% to about 40% of petrolatum.

The lotion compositions may be heterogeneous. They may contain solids, gel structures, polymeric material, a multiplicity of phases (such as oily and water phase) and/or emulsified components. It may be difficult to determine precisely the melting temperature of the lotion composition, i.e. difficult to determine the temperature of transition between the liquid form, the quasi-liquid from, the quasi-solid form and the solid form. The terms melting temperature, melting point, transition point and transition temperature are used interchangeably in this document and have the same meaning.

The lotion compositions may be semi-solid, of high viscosity so they do not substantially flow without activation during the life of the product or gel structures. The lotion compositions may be shear thinning and/or they may strongly change their viscosity around skin temperature to allow for transfer and easy spreading on a user's skin. The lotion compositions may be in the form of emulsions and/or dispersions.

In one example of a lotion composition, the lotion composition has a water content of less than about 20% and/or less than 10% and/or less than about 5% or less than about 0.5%. In another example, the lotion composition may have a solids content of at least about 15% and/or at least about 25% and/or at least about 30% and/or at least about 40% to about 100% and/or to about 95% and/or to about 90% and/or to about 80%.

A non-limiting example of a suitable lotion composition of the present invention comprises a chemical softening agent, such as an emollient, that softens, soothes, supples, coats, lubricates, or moisturizes the skin. The lotion composition may sooth, moisturize, and/or lubricate a user's skin.

The lotion composition may comprise an oil and/or an emollient. Non-limiting examples of suitable oils and/or emollients include glycols (such as propylene glycol and/or glycerine), polyglycols (such as triethylene glycol), petrolatum, fatty acids, fatty alcohols, fatty alcohol ethoxylates, fatty alcohol esters and fatty alcohol ethers, fatty acid ethoxylates, fatty acid amides and fatty acid esters, hydrocarbon oils (such as mineral oil), squalane, fluorinated emollients, silicone oil (such as dimethicone) and mixtures thereof.

Non-limiting examples of emollients useful in the present invention can be petroleum-based, fatty acid ester type, alkyl ethoxylate type, or mixtures of these materials. Suitable petroleum-based emollients include those hydrocarbons, or mixtures of hydrocarbons, having chain lengths of from 16 to 32 carbon atoms. Petroleum based hydrocarbons having these chain lengths include petrolatum (also known as "mineral wax," "petroleum jelly" and "mineral jelly"). Petrolatum usually refers to more viscous mixtures of hydrocarbons having from 16 to 32 carbon atoms. A suitable Petrolatum is available from Witco, Corp., Greenwich, Conn. as White Protopet® 1 S.

Suitable fatty acid ester emollients include those derived from long chain $C_{12}$-$C_{28}$ fatty acids, such as $C_{16}$-$C_{22}$ saturated fatty acids, and short chain $C_1$-$C_8$ monohydric alcohols, such as $C_1$-$C_3$ monohydric alcohols. Non-limiting examples of suitable fatty acid ester emollients include methyl palmitate, methyl stearate, isopropyl laurate, isopropyl myristate, isopropyl palmitate, and ethylhexyl palmitate. Suitable fatty acid ester emollients can also be derived from esters of longer chain fatty alcohols ($C_{12}$-$C_{28}$, such as $C_{12}$-$C_{16}$) and shorter chain fatty acids e.g., lactic acid, such as lauryl lactate and cetyl lactate.

Suitable fatty acid ester type emollients include those derived from $C_{12}$-$C_{28}$ fatty acids, such as $C_{16}$-$C_{22}$ saturated fatty acids, and short chain ($C_1$-$C_8$ and/or $C_1$-$C_3$) monohydric alcohols. Representative examples of such esters include methyl palmitate, methyl stearate, isopropyl laurate, isopropyl myristate, isopropyl palmitate, and ethylhexyl palmitate. Suitable fatty acid ester emollients can also be derived from esters of longer chain fatty alcohols ($C_{12}$-$C_{28}$ and/or $C_{12}$-$C_{16}$) and shorter chain fatty acids e.g., lactic acid, such as lauryl lactate and cetyl lactate.

Suitable alkyl ethoxylate type emollients include $C_{12}$-$C_{18}$ fatty alcohol ethoxylates having an average of from 3 to 30 oxyethylene units, such as from about 4 to about 23. Non-limiting examples of such alkyl ethoxylates include laureth-3 (a lauryl ethoxylate having an average of 3 oxyethylene units), laureth-23 (a lauryl ethoxylate having an average of 23 oxyethylene units), ceteth-10 (acetyl ethoxylate having an average of 10 oxyethylene units), steareth-2 (a stearyl ethoxylate having an average of 2 oxyethylene units) and steareth-10 (a stearyl ethoxylate having an average of 10 oxyethylene units). These alkyl ethoxylate emollients are typically used in combination with the petroleum-based emollients, such as petrolatum, at a weight ratio of alkyl ethoxylate emollient to petroleum-based emollient of from about 1:1 to about 1:3, preferably from about 1:1.5 to about 1:2.5.

The lotion compositions of the present invention may include an "immobilizing agent", so-called because they are believed to act to prevent migration of the emollient so that it can remain primarily on the surface of the fibrous structure to which it is applied so that it may deliver maximum softening benefit as well as be available for transferability to the user's skin. Suitable immobilizing agents for the present invention can comprise polyhydroxy fatty acid esters, polyhydroxy fatty acid amides, and mixtures thereof. To be useful as immobilizing agents, the polyhydroxy moiety of the ester or amide should have at least two free hydroxy groups. It is believed that these free hydroxy groups are the ones that co-crosslink through hydrogen bonds with the cellulosic fibers of the tissue paper web to which the lotion composition is applied and homo-crosslink, also through hydrogen bonds, the hydroxy groups of the ester or amide, thus entrapping and immobilizing the other components in the lotion matrix. Non-limiting examples of suitable esters and amides will have three or more free hydroxy groups on the polyhydroxy moiety and are typically nonionic in character. Because of the skin sensitivity of those using paper products to which the lotion composition is applied, these esters and amides should also be relatively mild and non-irritating to the skin.

Suitable polyhydroxy fatty acid esters for use in the present invention will have the formula:

wherein R is a $C_5$-$C_{31}$ hydrocarbyl group, such as a straight chain $C_7$-$C_{19}$ alkyl or alkenyl and/or a straight chain $C_9$-$C_{17}$ alkyl or alkenyl and/or a straight chain $C_{11}$-$C_{17}$ alkyl or alkenyl, or mixture thereof; Y is a polyhydroxyhydrocarbyl moiety having a hydrocarbyl chain with at least 2 free hydroxyls directly connected to the chain; and n is at least 1. Suitable Y groups can be derived from polyols such as glycerol, pentaerythritol; sugars such as raffinose, maltodextrose, galactose, sucrose, glucose, xylose, fructose, maltose, lactose, mannose and erythrose; sugar alcohols such as erythritol, xylitol, malitol, mannitol and sorbitol; and anhydrides of sugar alcohols such as sorbitan.

One class of suitable polyhydroxy fatty acid esters for use in the present invention comprises certain sorbitan esters, such as sorbitan esters of $C_{16}$-$C_{22}$ saturated fatty acids.

Immobilizing agents include agents that are may prevent migration of the emollient into the fibrous structure such that the emollient remain primarily on the surface of the fibrous structure and/or sanitary tissue product and/or on the surface treating composition on a surface of the fibrous structure and/or sanitary tissue product and facilitate transfer of the lotion composition to a user's skin. Immobilizing agents may function as viscosity increasing agents and/or gelling agents.

Non-limiting examples of suitable immobilizing agents include waxes (such as ceresin wax, ozokerite, microcrystalline wax, petroleum waxes, fisher tropsh waxes, silicone waxes, paraffin waxes), fatty alcohols (such as cetyl, cetaryl, cetearyl and/or stearyl alcohol), fatty acids and their salts (such as metal salts of stearic acid), mono and polyhydroxy fatty acid esters, mono and polyhydroxy fatty acid amides, silica and silica derivatives, gelling agents, thickeners and mixtures thereof.

In one example, the lotion composition comprises at least one immobilizing agent and at least one emollient.

Skin Benefit Agent

One or more skin benefit agents may be included in the lotion composition of the present invention. If a skin benefit agent is included in the lotion composition, it may be present in the lotion composition at a level of from about 0.5% to about 80% and/or about 0.5% to about 70% and/or from about 5% to about 60% by weight of the lotion.

Non-limiting examples of skin benefit agents include zinc oxide, vitamins, such as Vitamin B3 and/or Vitamin E, sucrose esters of fatty acids, such as Sefose 1618S (commercially available from Procter & Gamble Chemicals), antiviral agents, anti-inflammatory compounds, lipid, inorganic anions, inorganic cations, protease inhibitors, sequestration agents, chamomile extracts, aloe vera, calendula officinalis, alpha bisalbolol, Vitamin E acetate and mixtures thereof.

Non-limiting examples of suitable skin benefit agents include fats, fatty acids, fatty acid esters, fatty alcohols, triglycerides, phospholipids, mineral oils, essential oils, sterols, sterol esters, emollients, waxes, humectants and combinations thereof.

In one example, the skin benefit agent may be any substance that has a higher affinity for oil over water and/or provides a skin health benefit by directly interacting with the skin. Suitable examples of such benefits include, but are not limited to, enhancing skin barrier function, enhancing moisturization and nourishing the skin.

The skin benefit agent may be alone, included in a lotion composition and/or included in a surface treating composition. A commercially available lotion composition comprising a skin benefit agent is Vaseline® Intensive Care Lotion (Chesebrough-Pond's, Inc.).

The lotion composition may be a transferable lotion composition. A transferable lotion composition comprises at least one component that is capable of being transferred to an opposing surface such as a user's skin upon use. In one example, at least 0.1% of the transferable lotion present on the user contacting surface transfers to the user's skin during use.

Other Ingredients

Other optional ingredients that may be included in the lotion composition include vehicles, perfumes, especially long lasting and/or enduring perfumes, antibacterial actives, antiviral actives, disinfectants, pharmaceutical actives, film formers, deodorants, opacifiers, astringents, solvents, cooling sensate agents, such as camphor, thymol and menthol.

In a preferred embodiment, first ply 12 has a basis weight ranging from about 0 g/m² to about 18 g/m², preferably from about 11 g/m² to about 18 g/m², most preferably from about 14 g/m² to about 16.5 g/m² as determined by the basis weight test method described infra. In a preferred embodiment, first ply 12 has a wet burst value ranging from about 0 g and about 100 g, more preferably between about 10 g and about 80 g, most preferably between about 20 g and about 70 g as determined by the wet burst test method described infra. In a preferred embodiment, first ply 12 has a total tensile strength value ranging from about 0 g/in and about 500 g/in, more preferably between about 100 g/in and about 400 g/in, most preferably between about 150 g/in and about 350 g/in as determined by the total tensile test method described infra. In a preferred embodiment, first ply 12 has a void volume value ranging from about 0 mm³ to about 120 mm³, more preferably from about 55 mm³ to about 115 mm³, most preferably from about 55 mm³ to about 95 mm³ as determined by the test method described infra. In a preferred embodiment, first ply 12 has a bulk density value of greater than about 0.1 g/cm³, more preferably ranging from about 0.1 g/cm³ to about 0.2 g/cm³, most preferably from about 0.10 g/cm³ and about 0.16 g/cm³ as determined by the bulk density test method described infra. In a preferred embodiment, first ply 12 has a lint value of greater than about 3, more preferably from about 3 to about 9, most preferably from about 4 and about 7 as determined by the lint test method described infra. In a preferred embodiment, first ply 12 has a surface roughness (Sdr) of less than about 7, more preferably ranging from about 2 and about 7, most preferably between about 3 and about 5 as determined by the test method described infra. In a preferred embodiment, first ply 12 has a CD stretch value of less than about 7% as determined by the CD stretch test method described infra.

Second Ply

The multi-ply fibrous structure 10, according to the present invention, also preferably comprises a second ply 14 of fibrous structure that is bonded through bonding means 20 to the first ply 12 along their adjacent surfaces. The first ply 12 and second ply 14 of the multi-ply fibrous structure 10 of the present invention is preferably passively bonded together through bonding means 20. However, other means 20 known to those of skill in the art can be used to bond first ply 12 to second ply 14. For example, a certain amount of adhesive or other active bonding means could be added to provide additional adhesion to portions of the component plies to form bonding means 20. Additionally, needling, embossing, or other thermal or mechanical bonding means could be used to actively bond the plies of the multi-ply fibrous structure 10 near some or all of the edges of the multi-ply fibrous structure 10 thereby providing increased resistance to undesired delamination of the component plies.

Joining may also be by ultrasonic bonding or autogeneous bonding as disclosed in U.S. Pat. No. 4,919,738 issued Apr. 24, 1990 to Ball et al., or other bonding methods known in the art. For example, if the edges of the ply or layers are coextensive with the edges of the outer plies, adhesive bonding may not provide active bonding, depending on the adhesive used, and the surface energy characteristics of the ply. In this case, mechanical bonding may be more desirable, for example by mechanical bonding at a mechanical bonding station after formation of the multiple-ply web.

If used, an adhesive may cover less than about 30% and/or from about 0.1% to about 30% and/or from about 3% to about 30% and/or from about 5% to about 25% and/or from about 5% to about 20% of the bonded adjacent surfaces. The adhesive may be applied to one or more of the plies of the fibrous structure comprising multi-ply paper product 10 in a continuous and/or discontinuous network pattern, such as separate discrete dots and/or separate discrete stripes.

A non-limiting example of a second ply 14 suitable for use with the instant invention can provide for an embossed fibrous structure having embossment sites. The fibrous structure comprising second ply 14 may comprise a ply of fibrous structures selected from the group consisting of through-air dried fibrous structure plies, differential density fiber structure plies, wet-laid fibrous structure plies, air-laid fibrous structure plies, conventional fiber structure plies, and combinations thereof. Fibrous structures suitable for use for second ply 14 may comprise identical types of plies or mixtures of different types of plies. Additionally, the fibrous structure comprising second ply 14 may be foreshortened by creping and/or by wet micro contraction and/or by rush transferring. However, as would be known to one of skill in the art, the fibrous structure comprising second ply 14 may not be foreshortened.

The second ply 14 may be pattern densified. A pattern densified fibrous structure is characterized by having a relatively high bulk field of relatively low fiber density and an array of densified zones of relatively high fiber density. The high bulk field is alternatively characterized as a field of pillow regions. Densified zones can be referred to as knuckle regions. The densified zones may be discretely spaced within the high bulk field or may be interconnected either fully or partially within the high bulk field. A preferred method of making a pattern densified fibrous structure and devices suitable for producing such structures are described in U.S. Pat. Nos. 4,529,480 and 4,528,239.

However, one of skill in the art would also realize that the fibrous structure suitable for use as second ply 14 may be uncompacted and non-pattern densified. Such fibrous structures may be of a homogeneous or multi-layered construction. Further, such fibrous structures suitable for use as second ply 14 may be made with a fibrous furnish that produces a single layer embryonic fibrous web or a fibrous finish that produces a multi-layer embryonic fibrous web.

Additionally, as would be known to one of skill in the art, such fibrous structures suitable for producing second ply 14 may comprise one or more ingredients. Such ingredients may include softening agents, absorbency agents (such as surfactants), wet strength agents, lotions, antibacterial agents, coloring agents, perfumes, combinations thereof, and the like.

In a preferred embodiment, second ply 14 has a basis weight of greater than 18 g/m$^2$, more preferably ranging from about 18.1 g/m$^2$ to about 50 g/m$^2$, most preferably from about 19 g/m$^2$ to about 25 g/m$^2$ as determined by the basis weight test method described infra. In a preferred embodiment, second ply 14 has a wet burst value of greater than about 100 g, more preferably ranging from about 100 g and 500 g, most preferably from about 125 g and 350 g as determined by the wet burst test method described infra. In a preferred embodiment, second ply 14 has a total tensile strength value of greater than about 500 g/in, more preferably ranging from about 500 g/in and 1500 g/in, most preferably from about 700 g/in and about 1000 g/in as determined by the total tensile test method described infra. In a preferred embodiment, second ply 14 has a void volume value greater than about 120 mm$^3$, more preferably ranging from about 150 mm$^3$ and about 350 mm$^3$, most preferably about 180 mm$^3$ to about 350 mm$^3$ as determined by the test method described infra. In a preferred embodiment, second ply 14 has a bulk density value ranging from about 0 g/cm$^3$ to about 0.1 g/cm$^3$, more preferably about 0.04 g/cm$^3$ and about 0.08 g/cm$^3$ as determined by the bulk density test method as described infra. In a preferred embodiment, first ply 12 has a lint value ranging from about 0 to about 3 as determined by the lint test method described infra. In a preferred embodiment, second ply 14 has a surface roughness (Sdr) of greater than about 7, more preferably ranging from about 7 and about 30, most preferably from about 12 and about 25 as determined by the test method described infra. In a preferred embodiment, second ply 14 has a CD stretch of greater than 7% as determined by the CD stretch test method described infra.

In a preferred embodiment, the multi-ply paper product 10 has an Sdr ratio (second ply to first ply) greater than 1, more preferably ranging from about 1.5 to about 20, most preferably ranging from about 3 to about 8 as determined by the test method described infra. In a preferred embodiment, the multi-ply paper product 10 has a void volume ratio (second ply to first ply) greater than 1, more preferably ranging from about 1.5 to about 8.0, most preferably ranging from about 2.0 to about 6.0 as determined by the test method described infra.

Folding

Because multi-ply paper products 10 of the present invention are generally larger than the pack from in which they are provided, multi-ply paper products 10 of the present invention can be folded. Conventionally, a multi-ply paper product 10 can be folded in a way that divides its length (i.e. the folding lines 16 are transverse to the dispensing direction, parallel to the width of the tissues). Referring again to FIGS.

1 and 2, some conventional folding configurations can create 1 fold and 2 panels or 2 folds and 3 panels (so-called "V"-folding, "C"-folding, and "Z"-folding). Folding can be accomplished by various techniques known to those of skill in the art of folding web substrates.

Referring again to FIGS. 1 and 2, by way of non-limiting example, a multi-ply paper product 10 may be folded along a central fold line 16 as shown. This can facilitate the articulation of multi-ply paper product 10 around the central fold line 16 to create 2 panels (a "V-fold"). Alternatively, multi-ply paper product 10 can be folded along external fold lines 16 disposed proximate to the edges of multi-ply paper product 10 to create a leading fold and a trailing fold (a "C-fold" or a "Z-fold"). More panels and more folds can be provided as required. A central panel can be created to comprise more than one panel and comprise one or more folds.

Test Methods

The following test methods are representative of the techniques utilized to determine the physical characteristics of the multi-ply tissue product 10 and the first ply 12 and second ply 14 associated therewith.

1. Sample Conditioning and Preparation

Unless otherwise indicated, samples are conditioned according to Tappi Method #T4020M-88. Paper samples are conditioned for at least 2 hours at a relative humidity of 48 to 52% and within a temperature range of 22° to 24° C. Sample preparation and all aspects of testing using the following methods are confined to a constant temperature and humidity room.

2. Wet Burst

Wet burst strength is measured using a Thwing-Albert Intelect II STD Burst Tester. 16 plies of tissue are stacked in four groups of four. Using scissors, cut the samples so that they are approximately 208 mm in the machine direction and approximately 114 mm in the cross-machine direction, each four plies thick.

Take one sample strip, holding the sample by the narrow cross direction edges, dipping the center of the sample into a pan filled with about 25 ml of distilled water. Leave the sample in the water four (4.0+/−0.5) seconds. Remove and drain for three (3.0+/−0.5) seconds holding the sample so the water runs off in the cross direction. Proceed with the test immediately after the drain step. Place the wet sample on the lower ring of the sample holding device with the outer surface of the product facing up, so that the wet part of the sample completely covers the open surface of the sample holding ring. If wrinkles are present, discard the sample and repeat with a new sample. After the sample is properly in place on the lower ring, turn the switch that lowers the upper ring. The sample to be tested is now securely gripped in the sample holding unit. Start the burst test immediately at this point by pressing the start button. The plunger will begin to rise. At the point when the sample tears or ruptures, report the maximum reading. The plunger will automatically reverse and return to its original starting position. Repeat this procedure on three more samples for a total of four tests, i.e., 4 replicates. Average the four replicates and divide this average by four to report wet burst per ply, to the nearest gram.

3. Total Dry Tensile

The tensile strength is determined on one inch wide strips of similar ply samples using a Thwing Albert Vontage-10 Tensile Tester (Thwing-Albert Instrument Co., 10960 Dutton Rd., Philadelphia, Pa., 19154). This method is intended for use on finished paper products, reel samples, and unconverted stocks. This method is conducted on plies having similar characteristics and not on dissimilar plies.

a. Sample Conditioning and Preparation

Prior to tensile testing, the paper samples to be tested should be conditioned according to Tappi Method #T4020M-88. The paper samples should be conditioned for at least 2 hours at a relative humidity of 48 to 52% and within a temperature range of 22° to 24° C. Sample preparation and all aspects of the tensile testing should also take place within the confines of the constant temperature and humidity room.

For finished product, discard any damaged product. Take 16 plies of tissue and stack them in four stacks of four. Use stacks 1 and 3 for machine direction tensile measurements and stacks 2 and 4 for cross direction tensile measurements. Cut two 1" wide strips in the machine direction from stacks 1 and 3. Cut two 1" wide strips in the cross direction from stacks 2 and 4. There are now four 1" wide strips for machine direction tensile testing and four 1" wide strips for cross direction tensile testing. For these finished product samples, all eight 1" wide strips are four plies thick.

For unconverted stock and/or reel samples, cut a 15" by 15" sample which is 4 plies thick from a region of interest of the sample using a paper cutter (JDC-1-10 or JDC-1-12 with safety shield from Thwing-Albert Instrument Co., 10960 Dutton Road, Philadelphia, Pa. 19154). Make sure one 15" cut runs parallel to the machine direction while the other runs parallel to the cross direction. Make sure the sample is conditioned for at least 2 hours at a relative humidity of 48 to 52% and within a temperature range of 22° to 24° C. Sample preparation and all aspects of the tensile testing should also take place within the confines of the constant temperature and humidity room.

From this preconditioned 15" by 15" sample which is 4 plies thick, cut four strips 1" by 7" with the long 7" dimension running parallel to the machine direction. Note these samples as machine direction reel or unconverted stock samples. Cut an additional four strips 1" by 7" with the long 7" dimension running parallel to the cross direction. Note these samples as cross direction reel or unconverted stock samples. Make sure all previous cuts are made using a paper cutter (JDC-1-10 or JDC-1-12 with safety shield from Thwing-Albert Instrument Co., 10960 Dutton Road, Philadelphia, Pa., 19154). There are now a total of eight samples: four 1" by 7" strips which are 4 plies thick with the 7" dimension running parallel to the machine direction and four 1" by 7" strips which are 4 plies thick with the 7" dimension running parallel to the cross direction.

b. Operation of Tensile Tester

For the actual measurement of the tensile strength, use a Thwing Albert Vontage-10 Tensile Tester (Thwing-Albert Instrument Co., 10960 Dutton Rd., Philadelphia, Pa., 19154). Insert the flat face clamps into the unit and calibrate the tester according to the instructions given in the operation manual of the Thwing Albert Vontage-10. Set the instrument crosshead speed to 6.00 in/min and the 1st and 2nd gauge lengths to 4.00 inches. The break sensitivity should be set to 20.0 grams and the sample width should be set to 1.00" and the sample thickness at 0.025".

A load cell is selected such that the predicted tensile result for the sample to be tested lies between 25% and 75% of the range in use. For example, a 5000 gram load cell may be used for samples with a predicted tensile range of 1250 grams (25% of 5000 grams) and 3750 grams (75% of 5000 grams). The tensile tester can also be set up in the 10% range with the 5000 gram load cell such that samples with predicted tensiles of 125 grams to 375 grams could be tested.

Take one of the tensile strips and place one end of it in one clamp of the tensile tester. Place the other end of the paper strip in the other clamp. Make sure the long dimension of the strip is running parallel to the sides of the tensile tester. Also make sure the strips are not overhanging to the either side of the two clamps. In addition, the pressure of each of the clamps must be in full contact with the paper sample.

After inserting the paper test strip into the two clamps, the instrument tension can be monitored. If it shows a value of 5 grams or more, the sample is too taut. Conversely, if a period of 2-3 seconds passes after starting the test before any value is recorded, the tensile strip is too slack.

Start the tensile tester as described in the tensile tester instrument manual. The test is complete after the crosshead automatically returns to its initial starting position. Read and record the tensile load in units of grams from the instrument scale or the digital panel meter to the nearest unit.

If the reset condition is not performed automatically by the instrument, perform the necessary adjustment to set the instrument clamps to their initial starting positions. Insert the next paper strip into the two clamps as described above and obtain a tensile reading in units of grams. Obtain tensile readings from all the paper test strips. It should be noted that readings should be rejected if the strip slips or breaks in or at the edge of the clamps while performing the test.

c. Calculations

For the four machine direction 1" wide finished product strips, average the four individual recorded tensile readings. Divide this average by the number of plies tested to get the MD dry tensile per ply of the sample. Repeat this calculation for the cross direction finished product strips. To calculate total dry tensile of the sample, sum the MD dry tensile and CD dry tensile. All results are in units of grams/inch.

4. Basis Weight

One stack of 8 plies is made from the preconditioned samples. The stack of 8 plies is cut into a 4 inch by 4 inch square. A rule die from Acme Steel Rule Die Corp. (5 Stevens St. Waterbury Conn., 06714) is used to accomplish this cutting.

For the actual measurement of the weight of the sample, a top loading balance with a minimum resolution of 0.01 g is used. The stack of 8 plies is laid on the pan of the top loading balance. The balance is protected from air drafts and other disturbances using a draft shield. Weights are recorded when the readings on the balance become constant. Weights are measured in grams.

The weight reading is divided by the number of plies tested. The weight reading is also divided by the area of the sample which is normally 16 in$^2$, which is approximately equal to 0.0103 m$^2$.

The unit of measure for basis weight as used herein is grams/square meter. This is calculated using the 0.0103 m$^2$ area noted above.

5. Dry CD Stretch

Stretch is the percent cross-machine direction elongation of the laminate structure at peak tensile strength and is read directly from a secondary scale on a Thwing-Albert tensile tester. Dry CD stretch readings were taken concurrently with CD dry tensile strength readings.

6. Lint

The amount of lint generated from a tissue product is determined with a Sutherland Rub Tester. This tester uses a motor to rub a weighted felt 5 times over the stationary tissue. The Hunter Color L value is measured before and after the rub test. The difference between these two Hunter Color L values is calculated as lint.

a. Sample Preparation

Prior to the lint rub testing, the paper samples to be tested should be conditioned according to Tappi Method #T4020M-88. This rub testing should also take place within the confines of the constant temperature and humidity room.

The Sutherland Rub Tester may be obtained from Testing Machines, Inc. (Amityville, N.Y., 11701). The tissue is first prepared by removing and discarding any product which might have been abraded in handling. For multi-ply finished product, three sections with each containing two sheets of multi-ply product are removed and set on the bench-top. Each sample is then folded in half such that the crease is running along the cross direction (CD) of the tissue sample. Make sure one of the sides facing out is the same side facing out after the sample is folded. In other words, do not tear the plies apart from one another and rub test the sides facing one another on the inside of the product.

Obtain a 30 in.×40 in. piece of Crescent #300 cardboard from Cordage Inc. (800 E. Ross Road, Cincinnati, Ohio, 45217). Cut out three pieces of cardboard of dimensions of 2.5 in.×6 in. with a paper cutter. Puncture two holes into each of the six cards by forcing the cardboard onto the hold down pins of the Sutherland Rub tester. Center and carefully place each of the cardboard pieces on top of the three previously folded samples. Make sure the 6" dimension of the cardboard is running parallel to the machine direction (MD) of each of the tissue samples.

Fold one edge of the exposed portion of tissue sample onto the back of the cardboard. Secure this edge to the cardboard with adhesive tape obtained from 3M Inc. (¾" wide Scotch Brand, St. Paul, Minn.). Carefully grasp the other over-hanging tissue edge and snugly fold it over onto the back of the cardboard. While maintaining a snug fit of the paper onto the board, tape this second edge to the back of the cardboard. Repeat this procedure for each sample.

Turn over each sample and tape the cross direction edge of the tissue paper to the cardboard. One half of the adhesive tape should contact the tissue paper while the other half is adhering to the cardboard. Repeat this procedure for each of the samples. If the tissue sample breaks, tears, or becomes frayed at any time during the course of this sample preparation procedure, discard and make up a new sample with a new tissue sample strip.

b. Felt Preparation

Obtain a 30"×40" piece of Crescent #300 cardboard from Cordage Inc. (800 E. Ross Road, Cincinnati, Ohio, 45217). Cut out six pieces of cardboard of dimensions of 2.25 in.× 7.25 in. using a paper cutter,. Draw two lines parallel to the short dimension and down 1.125" from the top and bottom most edges on the white side of the cardboard. Carefully score the length of the line with a razor blade using a straight edge as a guide. Score it to a depth about half way through the thickness of the sheet. This scoring allows the cardboard/felt combination to fit tightly around the weight of the Sutherland Rub tester. Draw an arrow running parallel to the long dimension of the cardboard on this scored side of the cardboard.

Cut the six pieces of black felt (F-55 or equivalent from New England Gasket, 550 Broad Street, Bristol, Conn. 06010) to the dimensions of 2.25 in.×8.5 in.×0.0625 in. Place the felt on top of the un-scored, green side of the cardboard such that the long edges of both the felt and cardboard are parallel and in alignment. Make sure the fluffy side of the felt is facing up. Also allow about 0.5" to overhang the top and bottom most edges of the cardboard. Snuggly fold over both overhanging felt edges onto the backside of the cardboard with Scotch brand tape. Prepare a total of six of these felt/cardboard combinations.

For best reproducibility, all samples should be run with the same lot of felt. Obviously, there are occasions where a single lot of felt becomes completely depleted. In those cases where a new lot of felt must be obtained, a correction factor should be determined for the new lot of felt. To determine the correction factor, obtain a representative single tissue sample of interest, and enough felt to make up 24 cardboard/felt samples for the new and old lots.

As described below and before any rubbing has taken place, obtain Hunter L readings for each of the 24 cardboard/felt samples of the new and old lots of felt. Calculate the averages for both the 24 cardboard/felt samples of the old lot and the 24 cardboard/felt samples of the new lot.

Next, rub test the 24 cardboard/felt boards of the new lot and the 24 cardboard/felt boards of the old lot as described below. Make sure the same felt lot number is used for each of the 24 samples for the old and new lots. In addition, sampling of the paper in the preparation of the cardboard/tissue samples must be done so the new lot of felt and the old lot of felt are exposed as representative tissue samples. Next, obtain 48 strips of tissue each 8 in. long. Place the first strip on the far left of the lab bench and the last of the 48 samples on the far right of the bench. Mark the sample to the far left with the number "1" in a 1 cm×1 cm area of the corner of the sample. Continue to mark the samples consecutively up to 48 such that the last sample to the far right is numbered 48.

Use the 24 odd numbered samples for the new felt and the 24 even numbered samples for the old felt. Order the odd number samples from lowest to highest. Order the even numbered samples from lowest to highest.

Rub and measure the Hunter Color L values for all 24 samples of the old felt as described below. Average the 24 values. Subtract the average initial un-rubbed Hunter Color L felt reading from the average Hunter Color L reading for the rubbed samples. This is the uncorrected lint value for the old felt. If there is a current felt correction factor for the old felt, add it to the uncorrected lint value for the old felt. This value is the corrected Lint Value for the old felt.

Rub and measure the Hunter Color L values for all 24 samples of the new felt as described below. Average the 24 values. Subtract the average initial un-rubbed Hunter Color L felt reading from the average Hunter Color L reading for the rubbed samples. This is the uncorrected lint value for the new felt.

Take the difference between the corrected Lint Value from the old felt and the uncorrected lint value for the new felt. This difference is the felt correction factor for the new lot of felt. Adding this felt correction factor to the uncorrected lint value for the new felt should be identical to the corrected Lint Value for the old felt.

c. Care of 4-Pound Weight

The four pound weight has four square inches of effective contact area providing a contact pressure of one pound per square inch. Since the contact pressure can be changed by alteration of the rubber pads mounted on the face of the weight, it is important to use only the rubber pads supplied by the manufacturer (Brown Inc., Mechanical Services Department, Kalamazoo, Mich.). These pads must be replaced if they become hard, abraded or chipped off.

When not in use, the weight must be positioned such that the pads are not supporting the full weight of the weight. It is best to store the weight on its side.

d. Rub tester Instrument Calibration

The Sutherland Rub Tester must first be calibrated prior to use. First, turn on the Sutherland Rub Tester by moving the tester switch to the "cont" position. When the tester arm is in its position closest to the user, turn the tester's switch to the "auto" position. Set the tester to run 5 strokes by moving the pointer arm on the large dial to the "five" position setting. One stroke is a single and complete forward and reverse motion of the weight. The end of the rubbing block should be in the position closest to the operator at the beginning and at the end of each test.

Prepare a tissue paper on cardboard sample as described above. In addition, prepare a felt on cardboard sample as described above. Both of these samples will be used for calibration of the instrument and will not be used in the acquisition of data for the actual samples.

Place this calibration tissue sample on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the tissue sample and not the tissue sample itself. The felt must rest flat on the tissue sample and must be in 100% contact with the tissue surface. Activate the tester by depressing the "push" button.

Keep a count of the number of strokes and observe and make a mental note of the starting and stopping position of the felt covered weight in relationship to the sample. If the total number of strokes is five and if the end of the felt covered weight closest to the operator is over the cardboard of the tissue sample at the beginning and end of this test, the tester is calibrated and ready to use. If the total number of strokes is not five or if the end of the felt covered weight closest to the operator is over the actual paper tissue sample either at the beginning or end of the test, repeat this calibration procedure until 5 strokes are counted the end of the felt covered weight closest to the operator is situated over the cardboard at both the start and end of the test.

During the actual testing of samples, monitor and observe the stroke count and the starting and stopping point of the felt covered weight. Recalibrate when necessary.

e. Hunter Color Meter Calibration

Adjust the Hunter Color Difference Meter for the black and white standard plates according to the procedures outlined in the operation manual of the instrument. Also run the stability check for standardization as well as the daily color stability check if this has not been done during the past eight hours. In addition, the zero reflectance must be checked and readjusted if necessary.

Place the white standard plate on the sample stage under the instrument port. Release the sample stage and allow the sample plate to be raised beneath the sample port.

Using the "L-Y", "a-X", and "b-Z" standardizing knobs, adjust the instrument to read the Standard White Plate Values of "L", "a", and "b" when the "L", "a", and "b" push buttons are depressed in turn.

f. Measurement of Samples

The first step in the measurement of lint is to measure the Hunter color values of the black felt/cardboard samples prior to being rubbed on the tissue. The first step in this measurement is to lower the standard white plate from under the instrument port of the Hunter color instrument. Center a felt covered cardboard, with the arrow pointing to the back of the color meter, on top of the standard plate. Release the sample stage, allowing the felt covered cardboard to be raised under the sample port.

Since the felt width is only slightly larger than the viewing area diameter, make sure the felt completely covers the viewing area. After confirming complete coverage, depress the L push button and wait for the reading to stabilize. Read and record this L value to the nearest 0.1 unit.

If a D25D2A head is in use, lower the felt covered cardboard and plate, rotate the felt covered cardboard 90 degrees so the arrow points to the right side of the meter. Next, release the sample stage and check once more to make sure the viewing area is completely covered with felt. Depress the L push button. Read and record this value to the nearest 0.1 unit. For the D25D2M unit, the recorded value is the Hunter Color L value. For the D25D2A head where a rotated sample reading is also recorded, the Hunter Color L value is the average of the two recorded values.

Measure the Hunter Color L values for all of the felt covered cardboards using this technique. If the Hunter Color L values are all within 0.3 units of one another, take the average to obtain the initial L reading. If the Hunter Color L values are not within the 0.3 units, discard those felt/cardboard combinations outside the limit. Prepare new samples and repeat the Hunter Color L measurement until all samples are within 0.3 units of one another.

For the measurement of the actual tissue paper/cardboard combinations, place the tissue sample/cardboard combination on the base plate of the tester by slipping the holes in the board over the hold-down pins. The hold-down pins prevent the sample from moving during the test. Clip the calibration felt/cardboard sample onto the four pound weight with the cardboard side contacting the pads of the weight. Make sure the cardboard/felt combination is resting flat against the weight. Hook this weight onto the tester arm and gently place the tissue sample underneath the weight/felt combination. The end of the weight closest to the operator must be over the cardboard of the tissue sample and not the tissue sample itself. The felt must rest flat on the tissue sample and must be in 100% contact with the tissue surface.

Next, activate the tester by depressing the "push" button. At the end of the five strokes the tester will automatically stop. Note the stopping position of the felt covered weight in relation to the sample. If the end of the felt covered weight toward the operator is over cardboard, the tester is operating properly. If the end of the felt covered weight toward the operator is over sample, disregard this measurement and recalibrate as directed above in the Sutherland Rub Tester Calibration section.

Remove the weight with the felt covered cardboard. Inspect the tissue sample. If torn, discard the felt and tissue and start over. If the tissue sample is intact, remove the felt covered cardboard from the weight. Determine the Hunter Color L value on the felt covered cardboard as described above for the blank felts. Record the Hunter Color L readings for the felt after rubbing. Rub, measure, and record the Hunter Color L values for all remaining samples.

After all tissues have been measured, remove and discard all felt. Felts strips are not used again. Cardboards are used until they are bent, torn, limp, or no longer have a smooth surface.

g. Calculations

Determine the delta L values by subtracting the average initial L reading found for the unused felts from each of the measured values of the rubbed sample. Average the delta L values and add the felt factor to this final average. This final result is termed the lint.

7. Caliper

The caliper of a single or multiple ply sample is a measurement of thickness under a prescribed loading. The caliper of a ply is measured using the following procedure: A VIR Electronic Thickness Tester Model II available from Thwing-Albert, Philadelphia, Pa. is used to measure the thickness of the sample under a compressive loading of 95 g/in$^2$ provided by a foot having a 2-in. diameter. The caliper is reported as the arithmetic average of at least 8 such measurements.

8. Bulk Density

Bulk density or 'density' is the mathematical relationship of the basis weight of a sample divided by its caliper incorporating appropriate unit conversions as required. Bulk density as used herein has units of g/cm$^3$.

9. Surface Roughness

The sample of interest is mounted on a 75×50 mm glass slide (such as Corning Micro Slides #297, Croning Glass Works, Corning, N.Y.) using double sided tape (such as 3M #9589-007-1170). The machine direction of the sample is oriented in the 50 mm and the cross machine direction is oriented in the 75 mm direction of the slide. Only sufficient pressure is applied to the slide and tissue to afix the tissue without wrinkles, bubbles, or other artifacts and without damaging the surface. Surface roughness is measured using a Mahr Federal Stylus Profilometer #EMD4320 (Mahr Federal, Inc., Providence, R.I.) equipped with a stylus having a 2.5 µm radius (#EPT-1049). The stylus is powered by a Mahr Federal "432" amplifier. The output voltage of the amplifier is digitized using a National Instruments, Austin, Tex., NI USB 6009 (A/D) converter. The data acquisition and motion table are under the control of a National Instruments LabView Virtual Instrument designed by Weinman Technologies Inc., Saginaw, Mich. The sample is mounted on a motion table under the stylus tip. The sample is aligned with the machine direction being parallel to the stylus arm. The stylus tip is positioned approximately 0.5 in. from the bottom and approximately 1 in. from the left side of the sample. Proceed with scanning the sample from left to right. The motion table is a two axis table obtained from Design Components (DCI), Franlkin, Mass. Model CP#-22. The table has two DCI Stepper Motors #MC001. The stepper motors are powered by a Primatics Motor Drive Module, #MDM2200D, Tangent, Oreg. The motion table travels at a rate of 0.5 mm/second. The scan distance is 26 mm. The number of data points per scan is 256. The number of scans is 256 and the separation distance between the scan lines is 0.1 mm. The data is acquired and stored as a text file by the LabView Virtual Instrument.

10. SPIP Image Analysis

The text file generated in Labview is processed by opening the file in Scanning Probe Image Processor (SPIP) v4.2.4.0, available from Image Metrology, Lyngby, Denmark. The file is opened using the following settings: Data Type=ASCII; Structure Information: Auto Guess, Header Length=0, Number of X,Y Pixels=256,256, Number of Images=1; Physical Scaling: X Size (nm)=2.6E+7, Y Size (nm)=2.6E+7, Z-Scale Factor=1000, Time Per Scan Line (sec)=52, Time Per Image=1.3314E+4; The image is leveled by selecting the plane leveling tool: Mode=Custom. Use the computer mouse to click on "More". The plane leveling settings are as follows: Global Corrections=Polynomial Fit, Degree=3; Line-wise Correction=LMS Fit, Degree=3; Estimation Volume=Entire Image; Z Offset Method=Set mean to Zero. Use the computer mouse to click on the Main Window. Select the Histogram Tool and right click on the Histogram image to turn on the cursors. The calculated data of interest are found on the Image pictures: S3A=measured surface area, S2A=projected surface area, Sdr=S3A/S2A, Void volume and Smvr=Void Volume/S3A.

The values for Sdr and void volume for the combination of first ply 12 and second ply 14 comprising multi-ply paper product 10 are calculated and expressed as the ratio of the individual values for first ply 12 and second ply 14.

EXAMPLES

The following examples are representative of products resulting from the present invention. The physical parameters presented in Table 1 are values determined by the test methods described supra for the multi-ply tissue product 10 and the first ply 12 and second ply 14 associated therewith.

Example 1 a. First Ply

A 3% by weight aqueous slurry of NSK (northern softwood Kraft) is made in a conventional re-pulper. The NSK slurry is refined, and a 2% solution of Kymene 557LX is added to the NSK stock pipe at a rate sufficient to deliver 1% Kymene 557LX by weight of the dry fibers. The absorption of the wet strength resin is enhanced by passing the treated slurry though an in-line mixer. KYMENE 557LX is supplied by Hercules Corp of Wilmington, Del. A 1% solution of carboxy methyl cellulose is added after the in-line mixer at a rate of 0.15% by weight of the dry fibers to enhance the dry strength of the fibrous structure. The aqueous slurry of NSK fibers passes through a centrifugal stock pump to aid in distributing the CMC. An aqueous dispersion of DiTallow DiMethyl Ammonium Methyl Sulfate (DTDMAMS) (170° F./76.6° C.) at a concentration of 1% by weight is added to the NSK stock pipe at a rate of about 0.05% by weight DTDMAMS per ton of dry fiber weight.

A 3% by weight aqueous slurry of eucalyptus fibers is made in a conventional re-pulper. A 2% solution of Kymene 557LX is added to the eucalyptus stock pipe at a rate sufficient to deliver 0.25% Kymene 557LX by weight of the dry fibers. The absorption of the wet strength resin is enhanced by passing the treated slurry though an in-line mixer.

The NSK fibers are diluted with white water at the inlet of a fan pump to a consistency of about 0.15% based on the total weight of the NSK fiber slurry. The eucalyptus fibers, likewise, are diluted with white water at the inlet of a fan pump to a consistency of about 0.15% based on the total weight of the eucalyptus fiber slurry. The eucalyptus slurry and the NSK slurry are directed to a multi-channeled headbox suitably equipped with layering leaves to maintain the streams as separate layers until discharged onto a traveling Fourdrinier wire. A three-chambered headbox is used. The eucalyptus slurry containing 65% of the dry weight of the tissue ply is directed to the chamber leading to the layer in contact with the wire, while the NSK slurry comprising 35% of the dry weight of the ultimate tissue ply is directed to the chamber leading to the center and inside layer. The NSK and eucalyptus slurries are combined at the discharge of the headbox into a composite slurry.

The composite slurry is discharged onto the traveling Fourdrinier wire and is dewater assisted by a deflector and vacuum boxes. The Fourdrinier wire is of a 5-shed, satin weave configuration having 105 machine-direction and 107 cross-machine-direction monofilaments per inch. The speed of the Fourdrinier wire is about 800 fpm (feet per minute).

The embryonic wet web is dewatered to a consistency of about 15% just prior to transfer to a patterned drying fabric made in accordance with U.S. Pat. No. 4,529,480. The speed of the patterned drying fabric is the same as the speed of the Fourdrinier wire. The drying fabric is designed to yield a pattern-densified tissue with discontinuous low-density deflected areas arranged within a continuous network of high density (knuckle) areas. This drying fabric is formed by casting an impervious resin surface onto a fiber mesh supporting fabric. The supporting fabric is a 45×52 filament, dual layer mesh. The thickness of the resin cast is about 0.009 in. above the supporting fabric. The drying fabric for forming the first ply has about 562 discrete deflection regions per square inch. The area of the continuous network is about 50 percent of the surface area of the drying fabric.

Further dewatering is accomplished by vacuum assisted drainage until the web has a fiber consistency of about 25%. While remaining in contact with the patterned drying fabric, the web is pre-dried by air blow-through pre-dryers to a fiber consistency of about 65% by weight. The web is then adhered to the surface of a Yankee dryer, and removed from the surface of the dryer by a doctor blade at a consistency of about 97 percent. The Yankee dryer is operated at a surface speed of about 800 feet per minute. The dry web is passed through a rubber-on-steel calendar nip. The dry web is wound onto a roll at a speed of 680 feet per minute to provide dry foreshortening of about 15 percent. The resulting web has between about 562 and about 650 relatively low density domes per square inch (the number of domes in the web is between zero percent to about 15 percent greater than the number of cells in the drying fabric, due to dry foreshortening of the web).

b. Second Ply

A 0.1% consistency aqueous slurry of papermaking fibers, water, and additives is formed for deposition on a foraminous member. The aqueous slurry comprises a mixture of 60:40 by weight NSK and SSK (southern softwood Kraft) paper fibers. The additives include a wet strength additive, a dry strength additive, a wettability agent, and a softness additive. The wet strength additive comprises an effective amount of epichlorohydrin adduct in the form of about 20 pounds KYMENE 557LX per ton of dry fiber weight. The dry strength additive comprises an effective amount of Carboxy Methyl Cellulose (CMC) in the form of about 5 pounds of CMC 7MT per ton of dry fiber weight. CMC 7MT is supplied by Hercules Corp. The wettability agent comprises an effective amount of Dodecylphenoxy poly(ethylenoxy)ethanol in the form of about 1 pounds of IGEPAL per ton of dry fiber weight. IGEPAL is supplied by Rhone Poulence of Cranbury, N.J. The softness additive comprises an effective amount of Quaternary ammonium compound in the form of about 1 lb. of DTDMAMS per ton of dry fiber weight.

When forming the web from which the second ply is made, the slurry is deposited onto a Fourdrinier wire of a 5 shed, satin weave configuration having 87 machine direction and 76 cross-machine direction filaments per inch, and dewatered to a consistency of about 17% just prior to transfer to a patterned drying fabric. The resulting embryonic web is then transferred to the drying fabric to provide wet foreshortening of about 3 percent. The patterned drying fabric is made in accordance with U.S. Pat. No. 4,529,480 and is designed to yield a pattern densified tissue with discontinuous low-density deflected areas arranged within a continuous network of high density areas. This drying fabric is formed by casting an impervious resin surface onto a fiber mesh supporting fabric. The supporting fabric is a 45×52 filament, dual layer mesh. The thickness of the resin cast is about 0.014 in. above the supporting fabric. The drying fabric for forming the second ply has about 200 discrete deflection regions per square inch. The area of the continuous network is about 24 percent of the surface area of the drying fabric Further de-watering is accomplished by vacuum assisted drainage until the web has a fiber consistency of about 30%. While remaining in contact with the patterned drying fabric, the web is pre-dried by air blow-through pre-dryers to a fiber consistency of about 60% by weight. The web is then adhered to the surface of a yankee dryer, and removed from the surface of the dryer by a doctor blade at a consistency of about 97 percent. The Yankee dryer is operated at a surface speed of about 800 ft/min. The dry web is passed through a rubber-on-steel calendar nip. The dry web is wound onto a roll at a speed of 716 ft/min to provide dry foreshortening of about 10%. The resulting web has between about 200 and about 220 relatively low density domes per square inch (the number of domes in the web is between zero percent to about 10% greater than the number of cells in the drying fabric, due to dry foreshortening of the web).

The first and second plies are combined with the wire side facing out for the first ply and the fabric side facing out for the second ply. During the converting process, a surface softening agent is applied with a slot extrusion die to the outside surface of the first ply. The surface softening agent is a silicone solution (i.e. MR-1003, marketed by Wacker Chemical Corporation of Adrian, Mich.). The 19% silicone solution is applied to the web at a rate of 0.15% by weight. The plies are then bonded together with mechanical plybonding wheels, slit, and then folded into finished 2-ply facial tissue product. Each ply and the combined plies are tested in accordance with the test methods described supra. The results are presented in Table 1.

Example 2

The first ply is made the same as the first ply of Example 1, except the drying fabric is made of monofilaments arranged in a 5-shed weave having 59×44 (MD×CD) monofilaments per inch.

The second ply is made the same as the second ply of Example 1, except:
Aqueous fiber slurry comprises 100% NSK
Kymene level reduced to 12 lb/ton of dry fiber weight
No IGEPAL or DTDMAMS added to the fiber slurry
the drying fabric is made of woven monofilaments arranged in a 3-shed weave having 24×20 (MD×CD) monofilaments per inch.

The first and second plies are combined with both of their wire sides facing out. During the converting process, a surface softening agent is applied with a slot extrusion die to the outside surface of the first ply. The surface softening agent is a silicone solution (i.e. MR-1003, marketed by Wacker Chemical Corporation of Adrian, Mich.). The 19% silicone solution is applied to the web at a rate of 0.15% by weight. The plies are then bonded together with mechanical plybonding wheels, slit, and then folded into finished 2-ply facial tissue product. Each ply and the combined plies are tested in accordance with the test methods described supra. The results from this testing described supra are presented in Table 1.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

Any dimensions and/or calculated values disclosed herein are not to be understood as being strictly limited to the exact numerical values recited. Instead, unless otherwise specified, each such dimension and/or value is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-ply paper product comprising:
    (a) a first ply comprising a lotioned fibrous structure having a basis weight of less than about 18 g/m$^2$ and a wet burst value of less than about 80 grams;
    (b) a second ply comprising a non-lotioned fibrous structure having a basis weight of greater than about 19 g/m$^2$ and a wet burst value of greater than about 125 grams; and,
    wherein said multi-ply paper product has an overall wet burst value, said overall wet burst value being greater than the arithmetic sum of said wet burst value of said first ply and said wet burst value of said second ply.

2. The product according to claim 1, wherein said first ply has a total dry tensile of less than about 500 grams per inch, and said second ply has a total dry tensile greater than about 500 grams per inch.

3. The product according to claim 1, wherein said first ply has a cross-machine direction stretch less than about 7%, and said second ply has a cross-machine direction stretch greater than about 7%.

4. The product according to claim 1, wherein said first ply has a void volume of less than about 120 mm$^3$, and said second ply has a void volume of greater than about 120 mm$^3$.

TABLE 1

Exemplary Test Data for Example 1 and Example 2 Products.

| | Example 1 | | | Example 2 | | |
|---|---|---|---|---|---|---|
| | First Ply | Second Ply | Combined Plies | First Ply | Second Ply | Combined Plies |
| Wet Burst (g) | 48 | 180 | 265 | 38 | 184 | 246 |
| Basis Weight (g/m$^2$) | 14.8 | 22.5 | 36.7 | 15.0 | 20.2 | 34.6 |
| Total Dry Tensile (g/in) | 250 | 969 | 1135 | 240 | 1304 | 1430 |
| CD Stretch (%) | 7.0 | 14.3 | 11.5 | 4.9 | 10.8 | 8.3 |
| Bulk Density (g/cm$^3$) | 0.10 | 0.05 | 0.08 | 0.11 | 0.05 | 0.08 |
| Lint | 6.5 | 2 | 4.7 | 5 | 0.7 | 2.9 |
| Sdr | 3.1 | 19 | 6.13 | 3.5 | 11.1 | 3.17 |
| Void Volume (mm$^3$) | 60 | 191 | 3.18 | 79 | 123 | 1.56 |

5. The product according to claim 1, wherein said first ply has a bulk density of greater than about 0.10 g/cm³, and said second ply has a bulk density of less than about 0.10 g/cm³.

6. The product according to claim 1, wherein said second ply has printing disposed thereupon.

7. The product according to claim 1, wherein said first ply is ply bonded to said second ply.

8. The product according to claim 1, wherein said overall wet burst value ranges from about 10.8% to about 16.2% greater than the arithmetic sum of said wet burst value of said first ply and said wet burst value of said second ply.

9. The product of claim 1, wherein said multi-ply paper product is folded.

10. A multi-ply paper product comprising:
    (a) a first ply comprising a fibrous structure having a softening additive disposed thereon, a basis weight of less than about 18 g/m², and a wet burst value of less than about 80 grams;
    (b) a second ply comprising a fibrous structure having no softening additive disposed thereupon, a basis weight of greater than about 19 g/m², and a wet burst value of greater than about 125 grams; and,
    wherein said multi-ply paper product has an overall wet burst value, said overall wet burst value being greater than the arithmetic sum of said wet burst value of said first ply and said wet burst value of said second ply.

11. The product of claim 10, wherein said first ply has a total dry tensile of less than about 500 grams per inch, and said second ply has a total dry tensile value greater than about 500 grams per inch.

12. The product of claim 10, wherein said first ply has a cross-machine direction stretch less than about 7%, and said second ply has a cross-machine direction stretch of greater than about 7%.

13. The product of claim 10, wherein said first ply has a void volume of less than about 120 mm³, and said second ply has a void volume of greater than about 120 mm³.

14. The product of claim 10, wherein said first ply has a bulk density of greater than about 0.10 g/cm³, and said second ply has a bulk density of less than about 0.10 g/cm³.

15. The product of claim 10, wherein said second ply has printing disposed thereupon.

16. The product of claim 10, wherein said first ply is ply bonded to said second ply.

17. The process of claim 10, wherein said multi-ply paper product is folded.

18. The product according to claim 10, wherein said overall wet burst value ranges from about 10.8% to about 16.2% greater than the arithmetic sum of said wet burst value of said first ply and said wet burst value of said second ply.

19. A multi-ply paper product comprising:
    (a) a first ply comprising a fibrous structure having a softening additive, a basis weight of less than about 18 g/m², and a lotion disposed thereon, said first ply having a wet burst value of less than about 80 grams;
    (b) a second ply comprising a fibrous structure having no softening additive and no lotion disposed thereupon, said second ply having a basis weight of greater than about 19 g/m² and a wet burst value of greater than about 125 grams; and,
    wherein said multi-ply paper product has an overall wet burst value, said overall wet burst value being greater than the arithmetic sum of said wet burst value of said first ply and said wet burst value of said second ply.

20. The product of claim 19, wherein said first ply has a basis weight of less than about 16.5 g/m² and said second ply has a basis weight of greater than about 19 g/m².

21. The product according to claim 19, wherein said overall wet burst value ranges from about 10.8% to about 16.2% greater than the arithmetic sum of said wet burst value of said first ply and said wet burst value of said second ply.

\* \* \* \* \*